Figure 1:
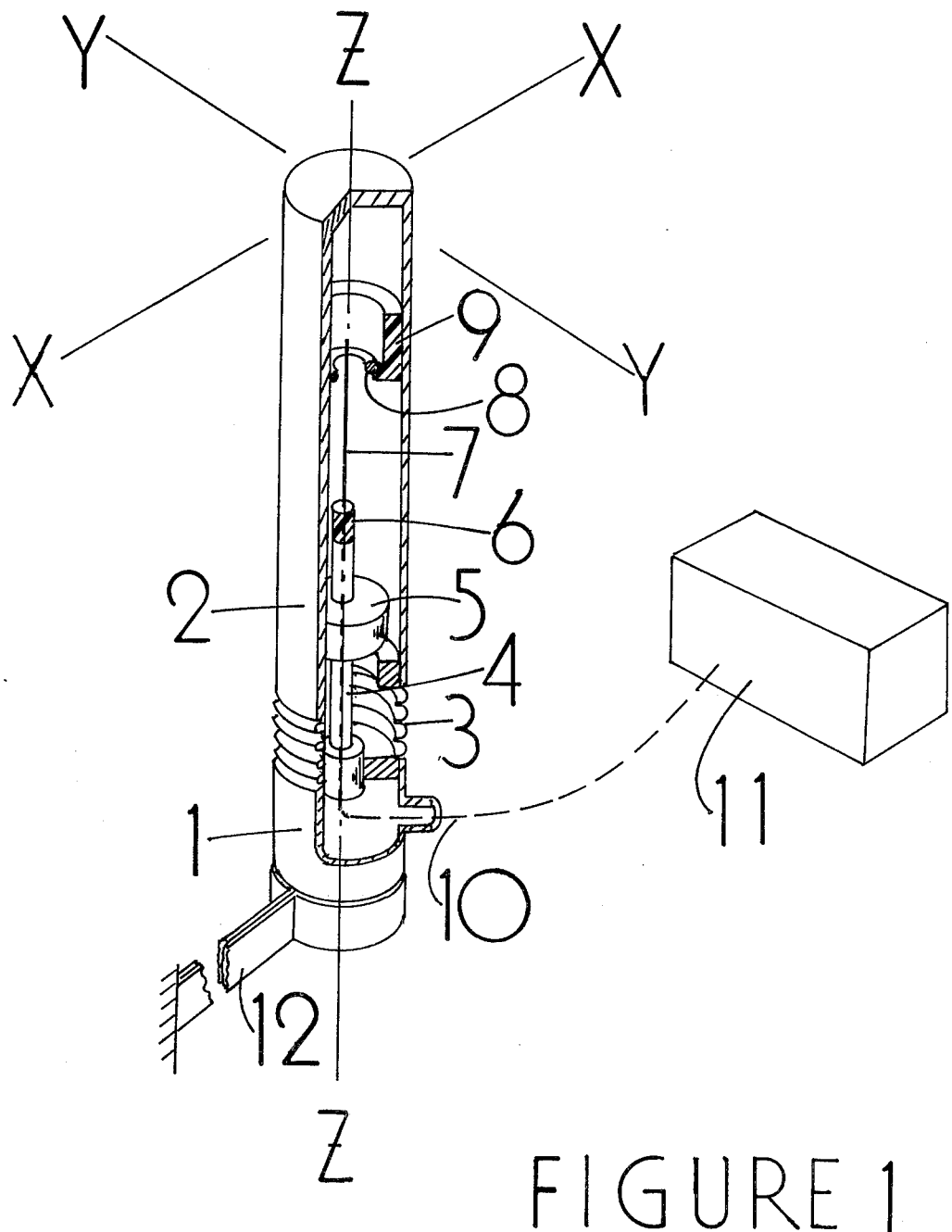

United States Patent [19]

Banwell et al.

[11] 4,161,118

[45] Jul. 17, 1979

[54] FORCE DIRECTION TRANSDUCER

[76] Inventors: Thomas J. Banwell, Claremont;
Thomas C. Banwell, both of 885
Atlanta Ct., Claremont, Calif. 91711

[21] Appl. No.: 859,605

[22] Filed: Dec. 12, 1977

[51] Int. Cl.$^2$ .............................................. G01F 1/28
[52] U.S. Cl. ...................................................... 73/188
[58] Field of Search ........................ 73/189, 170 A, 188

[56] References Cited

U.S. PATENT DOCUMENTS

| | | | |
|---|---|---|---|
| 2,462,577 | 2/1949 | Warren | 73/189 |
| 2,521,531 | 9/1950 | Mikelson | 73/189 |
| 2,665,583 | 1/1954 | Anjanos | 73/189 |
| 2,780,937 | 2/1957 | Haynes et al. | 73/189 |
| 3,277,706 | 10/1966 | Godet | 73/189 |
| 3,370,462 | 2/1968 | Bartlett et al. | 73/189 |
| 3,552,204 | 1/1971 | Tourmen | 73/189 X |

*Primary Examiner*—Jerry W. Myracle

[57] ABSTRACT

This invention concerns an electrical mechanical instrument transducer which accurately detects the direction of an externally applied force and more particularly, though by no means exclusively, transducer apparatus that provides an electrical signal commensurate to the direction of force or forces resulting from two-dimensional hydrodynamic flow such as waves, currents and tides. A toroidal resistive element and thin resilient wire electrical contact wiper provide accurate and sensitive, yet rugged and reliable transducer operation.

1 Claim, 1 Drawing Figure

FORCE DIRECTION TRANSDUCER

The increase in governmental and privately sponsored coastal engineering and oceanographic research has produced a need for improved apparatus capable of measuring wave direction. Information concerning this wave property is required in many areas, such as the design of harbors, marinas and off-shore structures, shore preservation and protection projects, and ocean condition forecasting. Originally, such information was gathered by personal observations; such a data acquisition procedure is time consuming and only as accurate as the skill and judgment of the observer. Susequently, techniques using arrays of wave height instruments, were developed to determine wave direction. These known techniques are inherently non-linear and require complicated and expensive instrumentation and data processing equipment beyond instrument interface.

This invention provides a novel and simple electrical mechanical apparatus, when placed below the water surface, that produces an electrical signal commensurate to the direction of passing water waves. We have determined, through our own research efforts, that the force vector resulting from a wave crest or wave trough passing a surface of revolution normal to a central axis is coincident with the direction of wave travel.

In our invention, hereinafter described in detail, an incident, axially normal force, by a lever arm arrangement, deflects a toroidal resistive element against, to make electrical contact with, a thin resilient wire electrical contact wiper, intersecting an arc of said element proportional to the angle of incidence of said force; as a result, the electrical resistance is directly and linearly proportional to the angle of incidence of said force. Known methods, employing constant current source circuits for instance, can be used to provide linear scaling to provide linear conversion from the resistance parameter of the transducer of this invention to a voltage, current, etc., as desired.

An object of the invention is to provide an improved two dimensional fluid force direction transducer device.

Another object of the invention is to provide an improved two dimensional fluid force direction transducer device.

Another object of the invention is to provide a simple and accurate wave direction transducer.

Another object of the invention is to provide a wave direction measurement transducer device possessing inherently well defined accuracy and resolution.

Another object of the invention is to provide a rugged and easily deployed wave direction transducer.

Another object of the invention is to provide a wave direction transducer device absent of rotating mechanical parts and experiencing little mechanical wear by utilizing only small mechanical displacements.

Another object of the invention is to provide a wave direction transducer which is insensitive to wave height or wave velocity magnitude.

Yet another object is to provide a wave direction transducer device which provides wave direction indication, uncorrelated with the exact physical relationship between wave velocity and the corresponding wave force magnitude acting on an immersed body.

Still another object of the invention is to provide a wave direction measurement transducer device with a linear, proportional transfer function and a fast response time.

The above mentioned and other features of our invention are more fully set forth in the following detailed description of a presently preferred embodiment of the invention, which description is presented with reference to the accompanying drawing, wherein:

FIG. 1 is a schematic isometric view, embodying the preferred form of the invention; partly broken away to illustrate details of construction.

Referring to FIG. 1, the base section 1 is cylindrical in shape and in normal mounting is held by known clamp 12 or similar device to a fixed structure, such as a leg of a pier or off-shore platform or to an anchor plate mounted on the ocean bottom.

The base section 1 is joined to the top section 2, also cylindrical in shape, by a flexible coupling 3. Top section 2 and base section 1 are preferably surfaces of revolution so as to minimize flow disturbances and to provide uniform direction response. A lever rod 4 extends from the base section 1 through the center of the flexible coupling 3 into the inside of the top section 2. An electrical insulator 6 is mounted to the top of the lever rod 4. A thin resilient wire 7 is attached to the insulator 6 extends through and beyond a toroidal shaped electrical resistor 8.

The direction transducer is comprised of toroidal resistance element 8, possessing a linear electrical resistance per unit or arc, attached to the insulator end cap 9 and concentrically mounted within the hollow cavity of top section 2, along with contact wiper 7 coaxialy fastened to bottom section 1.

The resistive nature of element 8 is not continuous over the entire element, but has a small break wherewith at least one end is terminated with an electrical lead; the other end of the resistive portion of the element is left electrically unterminated; nevertheless, said free end may also be terminated in an electrical lead for use with a standard known resistance voltage divider with all of the instrumental advantages attendant to the preferred two terminal resistance embodiment.

Electrical wiper 7 is a thin resilient wire with a diameter much smaller than the inner surface diameter of the toroidal resistance element 8, preferably at least by an order of magnitude. The resolution and accuracy of our wave direction transducer device is previously described, in terms of the normalized full scale response, is approximately the ratio of said contact wire's diameter to the inner circumference of said resistive element 8. A wave or series of waves travelling in any direction about the Z axes and impinging on the transducer will result in the top section 2 to tilt to a small angle in a direction opposite to the force with the flexible coupling 3 serving as a pivot point and a centering spring, this tilting motion results in wire 7 which is stationary to make electrical contact against the innerside of resistor 8, at a point on a resistance value equivalent to the force direction. Known clamp 12 restrains bottom section 1 and consequently electrical wiper 7 in a fixed reference position thus defining the X-Y plane in application. The tilt of the top section 2 is restricted by a circular stop 5 by making mechanical contact against the inner wall of the top section 2 after electrical contact is made. The electrical signal is transmitted through the contact wire 7 to conductor wire 10 to the electrical manipulating circuit represented by box 11. The electrical manipulating circuit 11, which linearly translates the resistance parameter of our transducer into a voltage or other desired signal form, may be local or remote with respect to the placement of said wave direction transducer.

The system of FIG. 1 has the further advantage of being completely environmentally sealed, low power consumption of transistor battery operation and constructed of corrosion resistant materials, however, the broadest concept of the invention may be employed without these advantages. For example, a ball and socket or diaphram could be used in place of a flexible bellows for the coupling 3, the toroidal resistor 8 may be wire wound or thin film deposit type and the actual full scale resistance value is not critical as long as it has linear resistance characteristics and the shape of the top section 2 may be any surface of revolution. Further modifications are possible and it is recognized that others equally or more skilled may possibly depart from the preferred embodiment of the present invention and all such are considered to fall within the spirit and scope of the appended claim.

What is claimed is:

1. In apparatus of the character described for determining the direction of a force or forces resulting from two-dimensional hydrodynamic flow, the combination of a toroidal electrical resistance element and a thin electrical contact wire, a top section and a bottom section comprising surfaces of revolution, said sections placed in the path of flow at a fixed point, said sections flexibly coupled and having coincident axes of revolution, means disposed within the sections for mounting an electrically insulated contact wire and toroidal electrical resistor so that the slight tilting due to the applied force against the top section causes the said wire to make electrical contact against the inner side of said resistor which provides, by means of an electrical manipulating circuit, an electrical signal which is commensurate to the direction of the applied forces.

* * * * *